(12) United States Patent
Nakajima et al.

(10) Patent No.: US 12,674,696 B2
(45) Date of Patent: Jul. 7, 2026

(54) ULTRASONIC FLOW SENSOR

(71) Applicant: SMC CORPORATION, Tokyo (JP)

(72) Inventors: Hiroto Nakajima, Tsukubamirai (JP);
Junya Okada, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 276 days.

(21) Appl. No.: 18/543,918

(22) Filed: Dec. 18, 2023

(65) Prior Publication Data

US 2024/0200995 A1     Jun. 20, 2024

(30) Foreign Application Priority Data

Dec. 19, 2022    (JP) ................................. 2022-201964
Oct. 18, 2023    (JP) ................................. 2023-179210

(51) Int. Cl.
   *G01F 1/66*      (2022.01)
   *G01F 1/667*     (2022.01)
   *G01F 15/14*     (2006.01)
   *G01F 15/18*     (2006.01)

(52) U.S. Cl.
   CPC .............. *G01F 1/662* (2013.01); *G01F 1/667* (2013.01); *G01F 15/14* (2013.01); *G01F 15/18* (2013.01)

(58) Field of Classification Search
   CPC .......... G01F 1/662; G01F 1/667; G01F 15/14; G01F 15/18
   See application file for complete search history.

(56) References Cited

U.S. PATENT DOCUMENTS

| | | | |
|---|---|---|---|
| 5,001,936 | A | 3/1991 | Baumoel |
| 9,696,195 | B2 * | 7/2017 | Ishikawa ................. G01F 1/667 |
| 2007/0251314 | A1 | 11/2007 | Molenaar et al. |
| 2016/0334251 | A1 * | 11/2016 | Otsu ...................... G01F 15/14 |
| 2018/0209830 | A1 | 7/2018 | Ishikawa et al. |

FOREIGN PATENT DOCUMENTS

| | | |
|---|---|---|
| GB | 1 311 021 | 3/1973 |
| JP | 61-84523 A | 4/1986 |
| JP | 6474682 B2 | 2/2019 |
| KR | 10-1948290 B1 | 2/2019 |

OTHER PUBLICATIONS

Extended European Search Report dated May 2, 2024 in corresponding European Patent Application No. 23215831.1, 9 pages.
Japanese Notice of Reason for Refusal issued Sep. 5, 2023, in Japanese Patent Application No. 2022-201964, 4 pages (with Machine Generated English Translation).
European Office Action issued Nov. 28, 2025 in European Patent Application No. 23215831.1, 7 pages.

* cited by examiner

*Primary Examiner* — Kristina M Deherrera
*Assistant Examiner* — Gedeon M Kidanu
(74) *Attorney, Agent, or Firm* — Oblon, McClelland, Maier & Neustadt, L.L.P.

(57)         ABSTRACT

An ultrasonic flow sensor is constituted by a body assembly and clamp assemblies positioned at opposite ends of the body assembly. The body assembly includes a housing that houses an ultrasonic element and the clamp assemblies include clamp bands. The clamp assemblies are supported on the housing in a manner so that the clamp assemblies are displaceable in a direction perpendicular to a bottom surface of the housing that comes in contact with the tube.

15 Claims, 17 Drawing Sheets

10

<u>10</u>

100

100

ULTRASONIC FLOW SENSOR

CROSS-REFERENCE TO RELATED APPLICATIONS

This application is based upon and claims the benefit of priority from Japanese Patent Applications No. 2022-201964 filed on Dec. 19, 2022 and No. 2023-179210 filed on Oct. 18, 2023, the contents of which are incorporated herein by reference.

BACKGROUND OF THE INVENTION

Field of the Invention

The present invention relates to an ultrasonic flow sensor attached to the outside of a tube.

Description of the Related Art

There is a known technique in which an ultrasonic flow sensor is attached to the outside of a tube to measure the flow rate of a fluid flowing inside the tube.

For example, JP 6474682 B2 describes an ultrasonic flow rate switch including an element holder for holding an ultrasonic element, and a fixture for holding the element holder and being attached to the outer surface of a tube in a detachable manner. The ultrasonic flow switch is constructed in such a way that the position of the element holder in the radial direction of the tube can be adjusted on the fixture.

SUMMARY OF THE INVENTION

However, the ultrasonic flow sensor requires a step of securing the fixture to the tube and a step of subsequently securing the element holder to the fixture. This makes the work of attaching the ultrasonic flow sensor laborious.

The present invention has the object of solving the aforementioned problems.

The present invention is an ultrasonic flow sensor mounted to an outside of a tube and is constituted by a body assembly and clamp assemblies positioned at opposite ends of the body assembly. The body assembly includes a housing that houses the ultrasonic element, and the clamp assemblies include clamp bands, the clamp assemblies being supported on the housing in a manner so that the clamp assemblies are displaceable in a direction perpendicular to a bottom surface of the housing that comes in contact with the tube.

According to the ultrasonic flow sensor of the present invention, the body assembly together with the clamp assemblies can be integrally attached to the tube by simply tightening the tube with the clamp band. Further, since the clamp assembly is supported on the housing of the body assembly in a manner so that the clamp assemblies are displaceable in the radial direction of the tube, in comparison with the case where the body assembly and the clamp assemblies are coupled together, manufacturing errors hardly affect the attitude of the ultrasonic flow sensor in a state of being attached to the tube, and axial misalignment of the tube is prevented as much as possible.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

Figure 1:
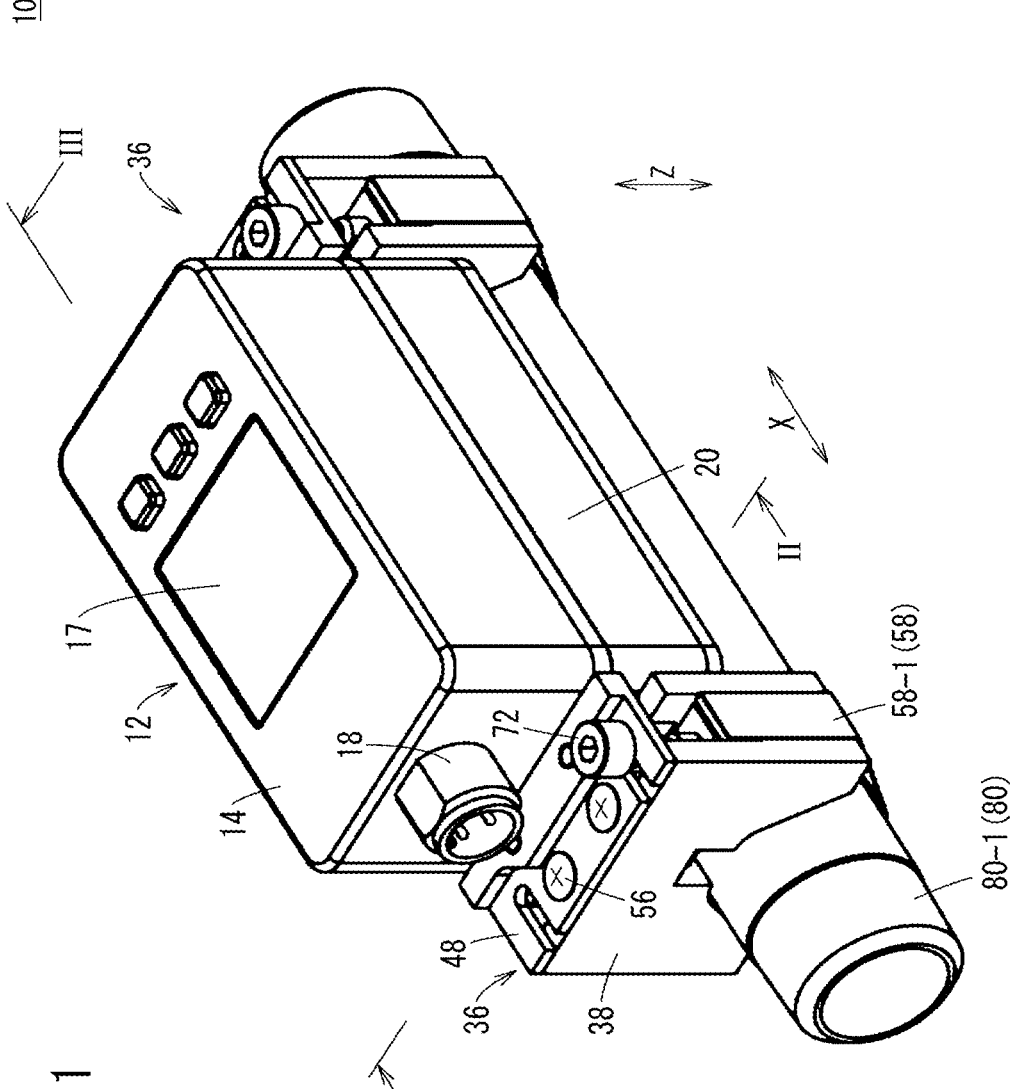
FIG. 1 is an external view of an ultrasonic flow sensor according to a first embodiment of the present invention when the ultrasonic flow sensor is attached to a first tube.

An ultrasonic flow sensor 10 according to a first embodiment of the present invention will be described with reference to FIGS. 1 to 7. As shown in FIG. 1, the ultrasonic flow sensor 10 includes a body assembly 12 and clamp assemblies 36 that are positioned at opposite ends of the body assembly 12. These clamp assemblies 36 are identical in construction to each other. The ultrasonic flow sensor 10 is attached to the outside of a cylindrical tube 80.

Assuming a state in which the ultrasonic flow sensor 10 is attached to the tube 80, the direction parallel to the longitudinal direction of the tube 80 is referred to as the X direction. The direction parallel to the diameter of the tube 80 extending through the approximate center of the ultrasonic flow sensor 10 as viewed from the direction along the X direction is referred to as the Z direction. With respect to the Z direction, the direction away from the tube 80 is referred to as "up", and the direction toward the tube 80 is referred to as "down"; words relating to up and down will be used hereinafter. That is, when words relating to up and down are used, they mean the up and down directions in FIG. 2.

Figure 3:
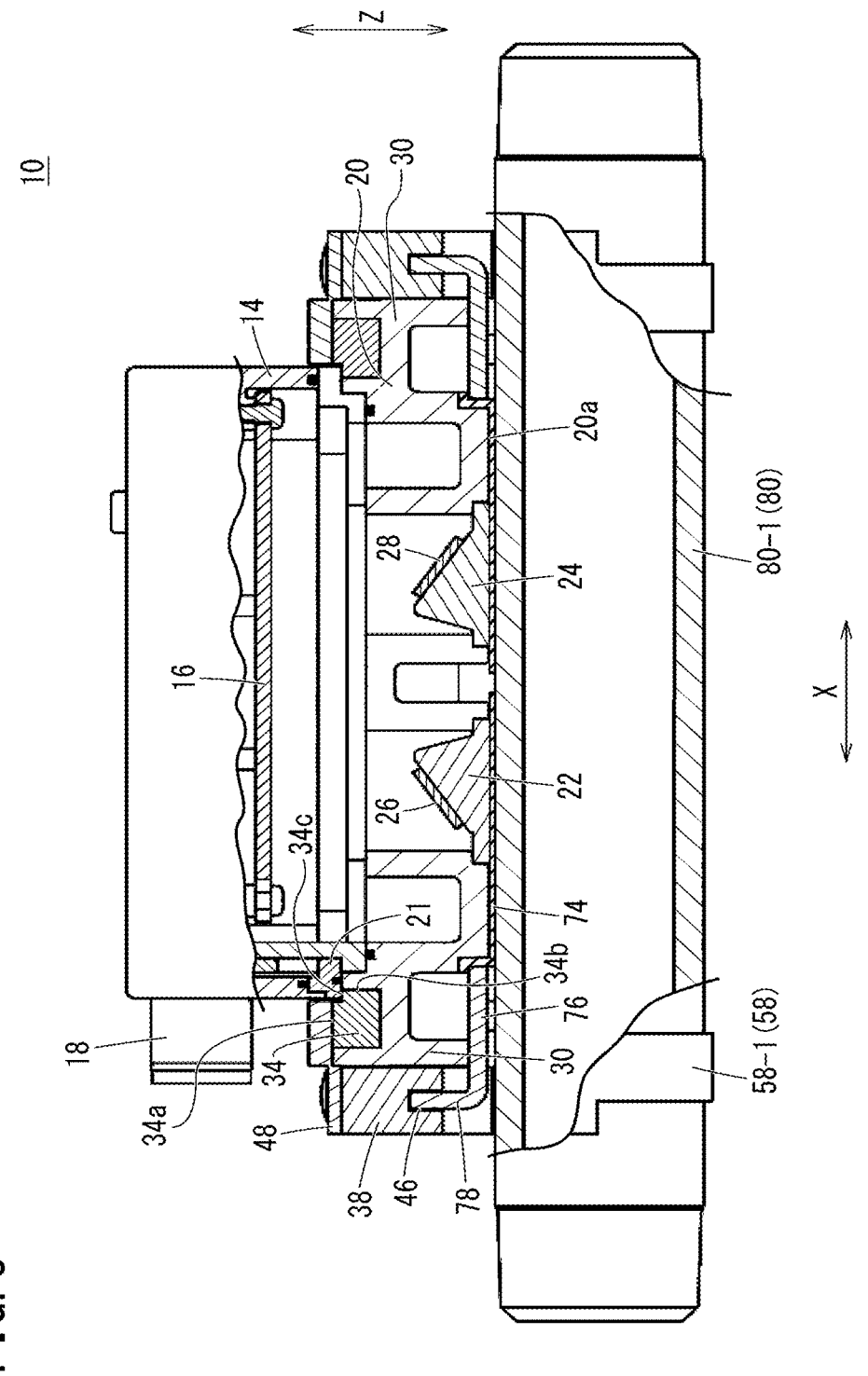
FIG. 3 is a cross-sectional view of the ultrasonic flow sensor of FIG. 1 along line III-III.

The body assembly 12 is constructed in a rectangular parallelepiped shape by the combination of an upper housing 14 and a lower housing 20. As shown in FIG. 3, a first path member 22 and a second path member 24 are disposed inside the lower housing 20. A first ultrasonic element 26 is bonded to the upper surface of the first path member 22, and a second ultrasonic element 28 is bonded to the upper surface of the second path member 24. The interior space of the lower housing 20 is closed by the first path member 22 and the second path member 24. The lower surfaces of the first path member 22 and the second path member 24 are located slightly lower than a bottom surface 20a of the lower housing 20.

The lower housing 20 has support portions 30 protruding from both X-direction ends thereof. A plate-like couplant holder 76 is fixed to the bottom of the lower housing 20 including the support portion 30. The couplant holder 76 has a rectangular opening at a central portion. A couplant 74 constructed in the form of a rectangular sheet from a rubber material is attached to the bottom surface 20a of the lower housing 20. The outer periphery of the couplant 74 is held between the lower housing 20 and the inner periphery of the couplant holder 76.

The bottom surface 20a of the lower housing 20, together with the first path member 22 and the second path member 24, can contact the tube 80 via the couplant 74. Ultrasonic waves transmitted from one of the first ultrasonic element 26 and the second ultrasonic element 28 pass through one of the first path member 22 and the second path member 24 and further through the couplant 74 to be incident on the fluid in the tube 80. Ultrasonic waves that have passed through the fluid are reflected in the tube 80, through the couplant 74, and through the other of the first path member 22 and the second path member 24 to be received by the other of the first ultrasonic element 26 and the second ultrasonic element 28.

Figure 4:
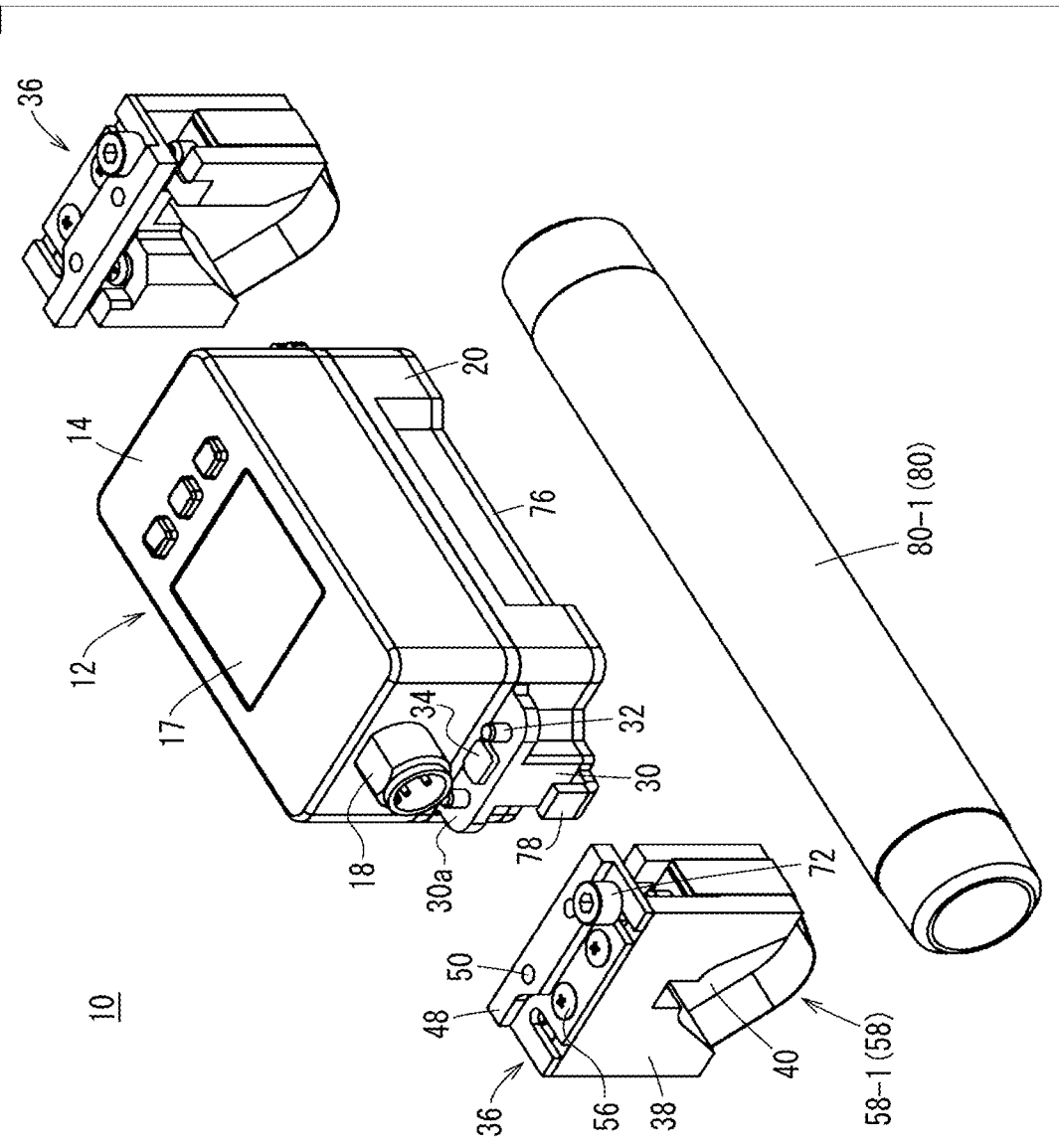
FIG. 4 is a view of the ultrasonic flow sensor of FIG. 1 with clamp assemblies separated from a body assembly.

As shown in FIG. 4, a portion of the couplant holder 76 protrudes in the X direction from the support portion 30 and has an engagement claw 78 that extends upward from an end of the protruding. The upper surface 30a of the support portion 30 is provided with a pair of engagement pins 32. As shown in FIG. 3, an elastic cushion material 34 is placed at an upper portion of the support portion 30. The rectangular parallelepiped cushion material 34 has a notched step portion 34c at the intersection of the upper surface 34a and one side surface 34b. A spacer 21 fixed between the lower end of the upper housing 14 and the lower housing 20 engages with the step portion 34c of the cushion material 34 to prevent the cushion material 34 from coming off. An upper portion of the cushion material 34 protrudes from the upper surface 30a of the support portion 30 by a predetermined amount.

Inside the upper housing 14, a circuit board 16 is placed. The circuit board 16 calculates the flow rate of the fluid flowing through the tube 80 based on the signals detected by the first ultrasonic element 26 and the second ultrasonic element 28. The upper housing 14 includes a connector 18. The circuit board 16 is electrically connected to external devices through the connector 18. It should be noted that reference numeral 17 denotes a display screen for displaying the flow rate.

Figure 5:
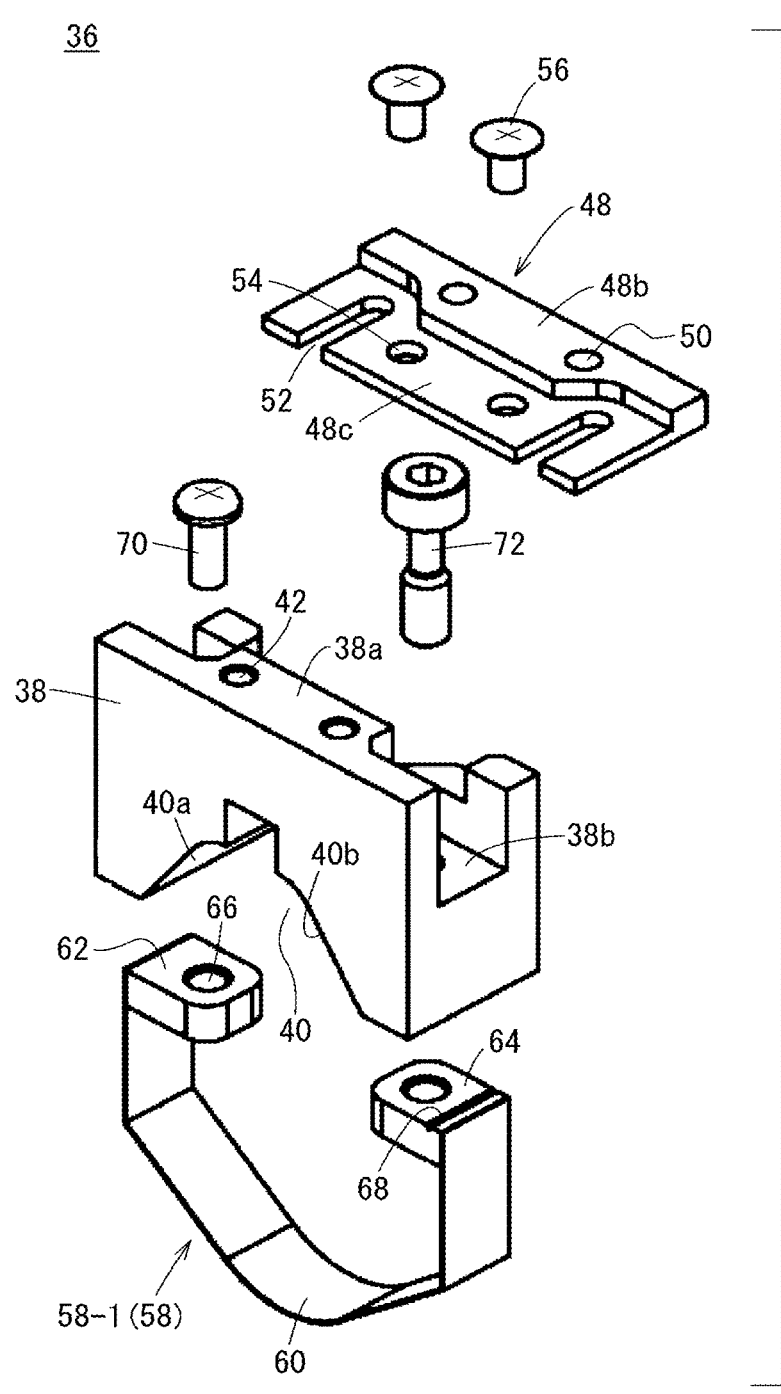
FIG. 5 is a view of a clamp assembly of the ultrasonic flow sensor of FIG. 1 disassembled into components.

As shown in FIG. 5, the clamp assembly 36 includes a clamp body 38, a clamp plate 48, and a clamp band 58. The clamp body 38 has a recess 40 at a lower portion that receives the tube 80. The clamp body 38 rests against the outer surface of the cylindrical tube 80 on two inclined planes 40a, 40b that form the recess 40. The contact position with the tube 80 on the inclined planes 40a, 40b varies depending on the outer diameter of the tube 80. Regarding two types of tubes described later, in the case of the second tube 80-2 with a large outer diameter, the contact position with the tube on the inclined planes 40a, 40b is lower by the length L than in the case of the first tube 80-1 with a small outer diameter (see FIG. 7).

Figure 2:
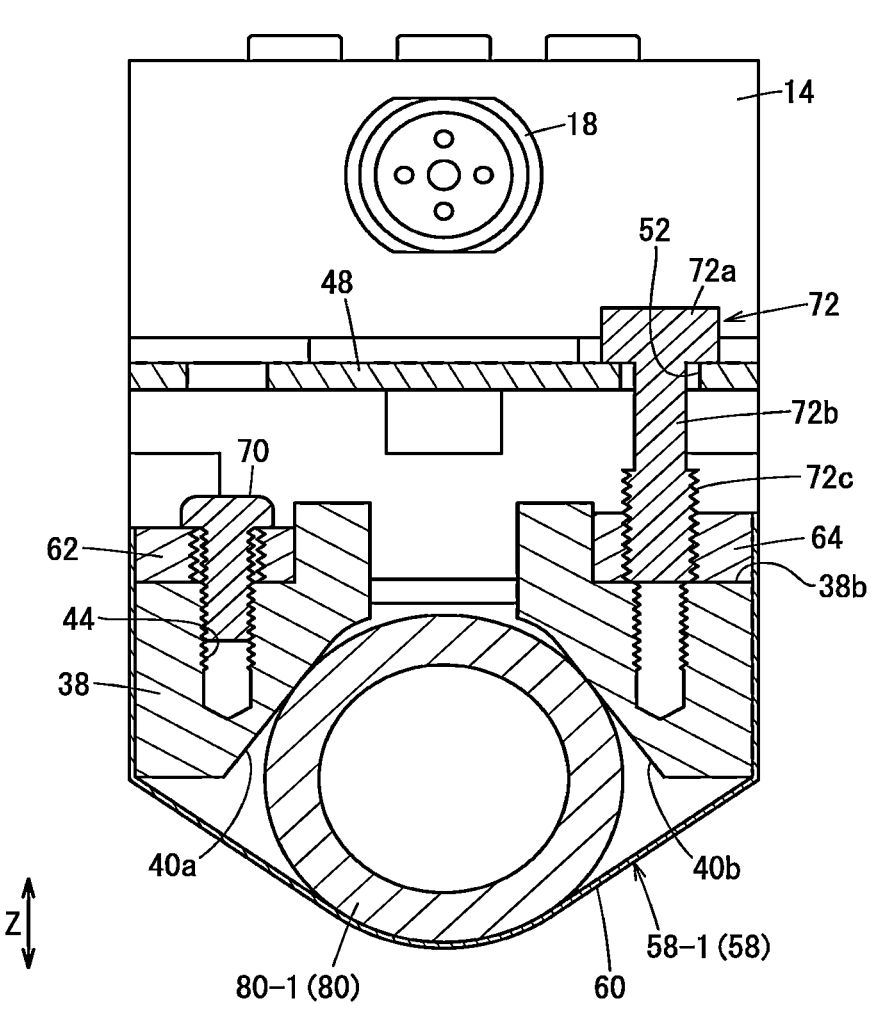
FIG. 2 is a cross-sectional view of the ultrasonic flow sensor of FIG. 1 along line II-II.

The clamp body 38 has a pair of first screw holes 42 and a pair of second screw holes 44 (see FIG. 2). The first screw hole 42 opens into the top surface 38a of the clamp body 38. The clamp body 38 has a reference surface 38b for attaching the clamp band 58. The reference surface 38b is located lower than the top surface 38a and higher than the recess 40. The second screw hole 44 opens into the reference surface 38b of the clamp body 38. The clamp body 38 has an engagement groove 46 above the recess 40 (see FIG. 3). The engagement claw 78 of the couplant holder 76 is insertable into the engagement groove 46 of the clamp body 38. The clamp body 38 has a symmetrical shape with respect to a plane that includes the axis of the tube 80 and extends in the Z direction.

Figure 6:
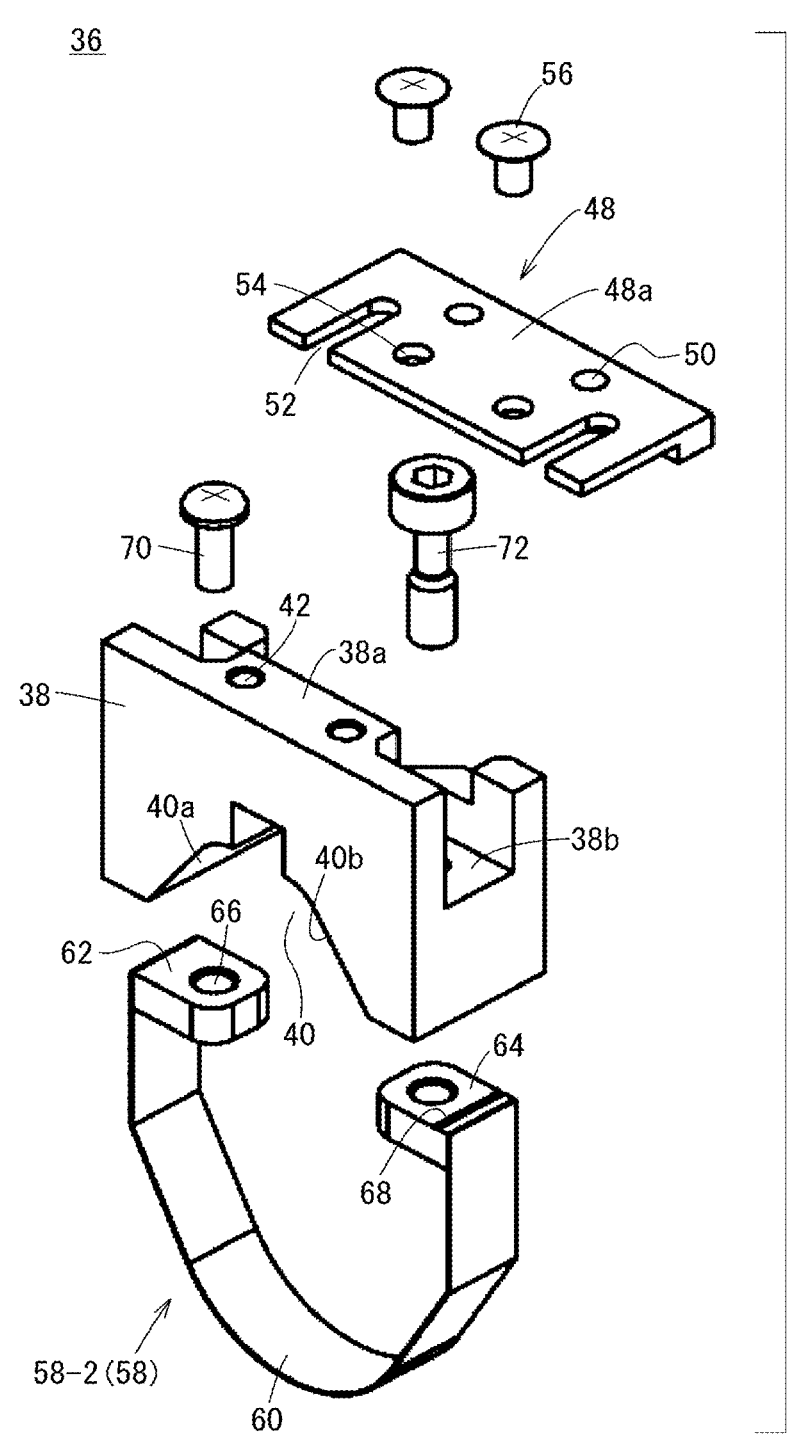
FIG. 6 is a view where a clamp assembly of the ultrasonic flow sensor of FIG. 1 modified for second tube attachment is disassembled into components.
Figure 7:
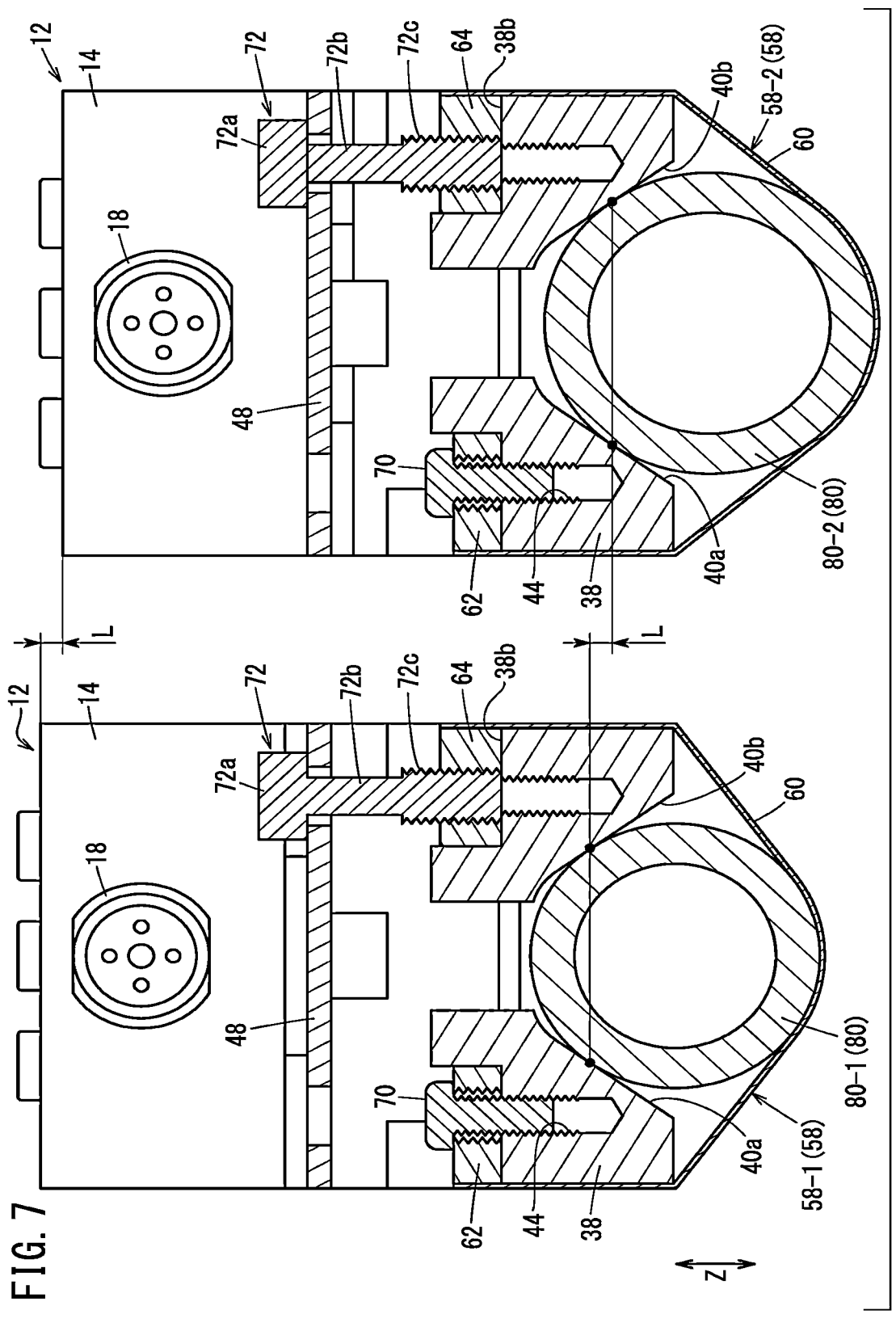
FIG. 7 is a diagram showing the case where the ultrasonic flow sensor of FIG. 1 is attached to the first tube in contrast to the case where the ultrasonic flow sensor is attached to the second tube.
Figure 8:
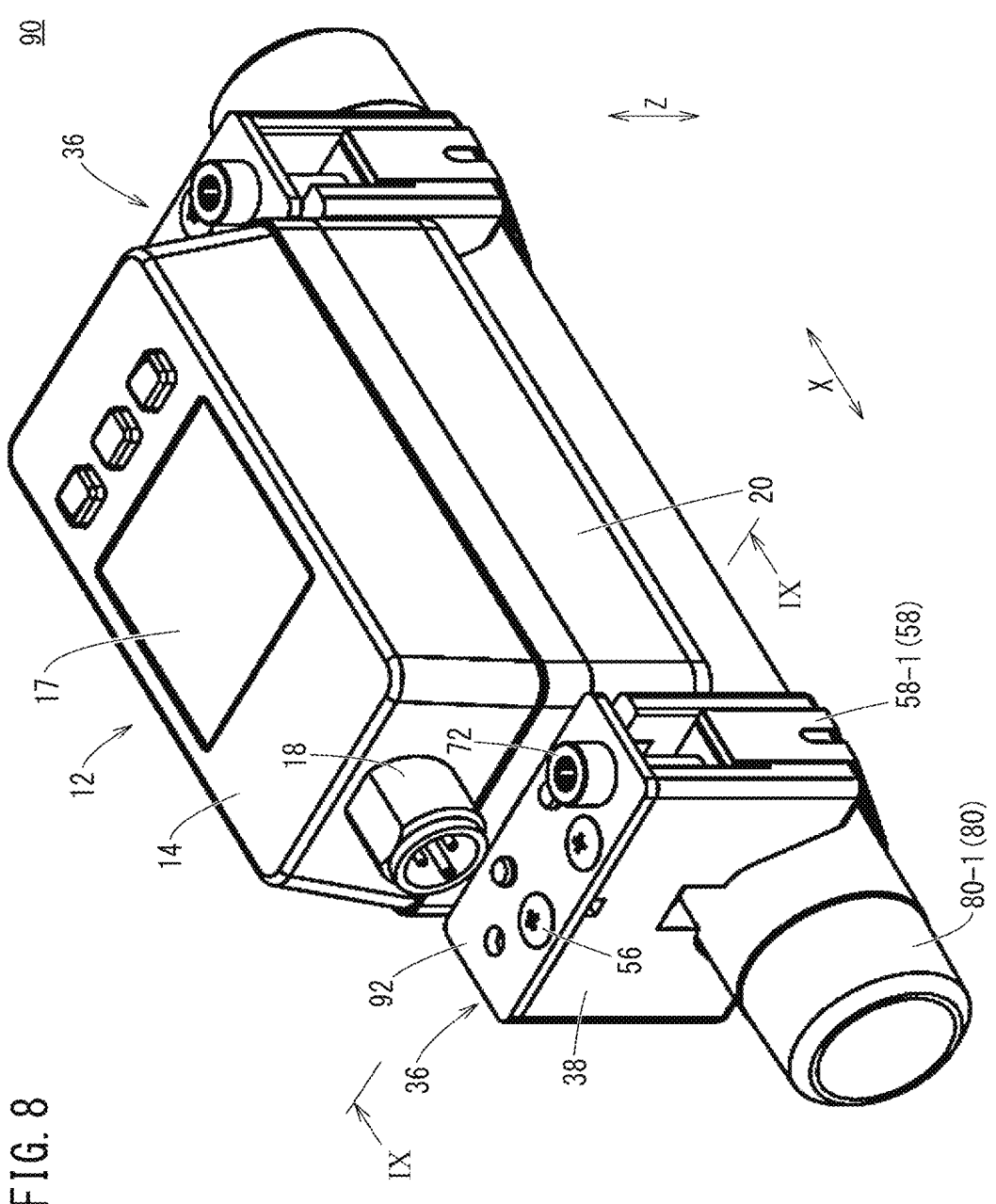
FIG. 8 is an external view of an ultrasonic flow sensor according to the second embodiment of the present invention when the ultrasonic flow sensor is attached to the first tube.
Figure 9:
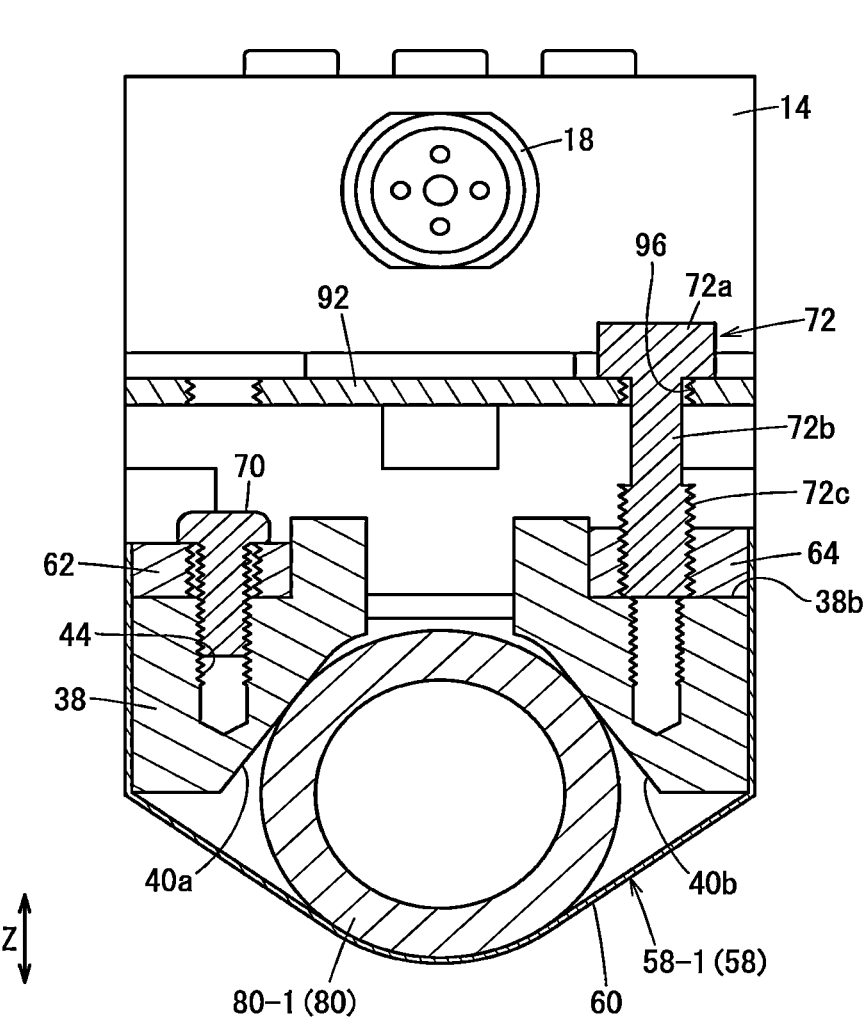
FIG. 9 is a cross-sectional view of the ultrasonic flow sensor of FIG. 8 taken along line IX-IX.
Figure 10:
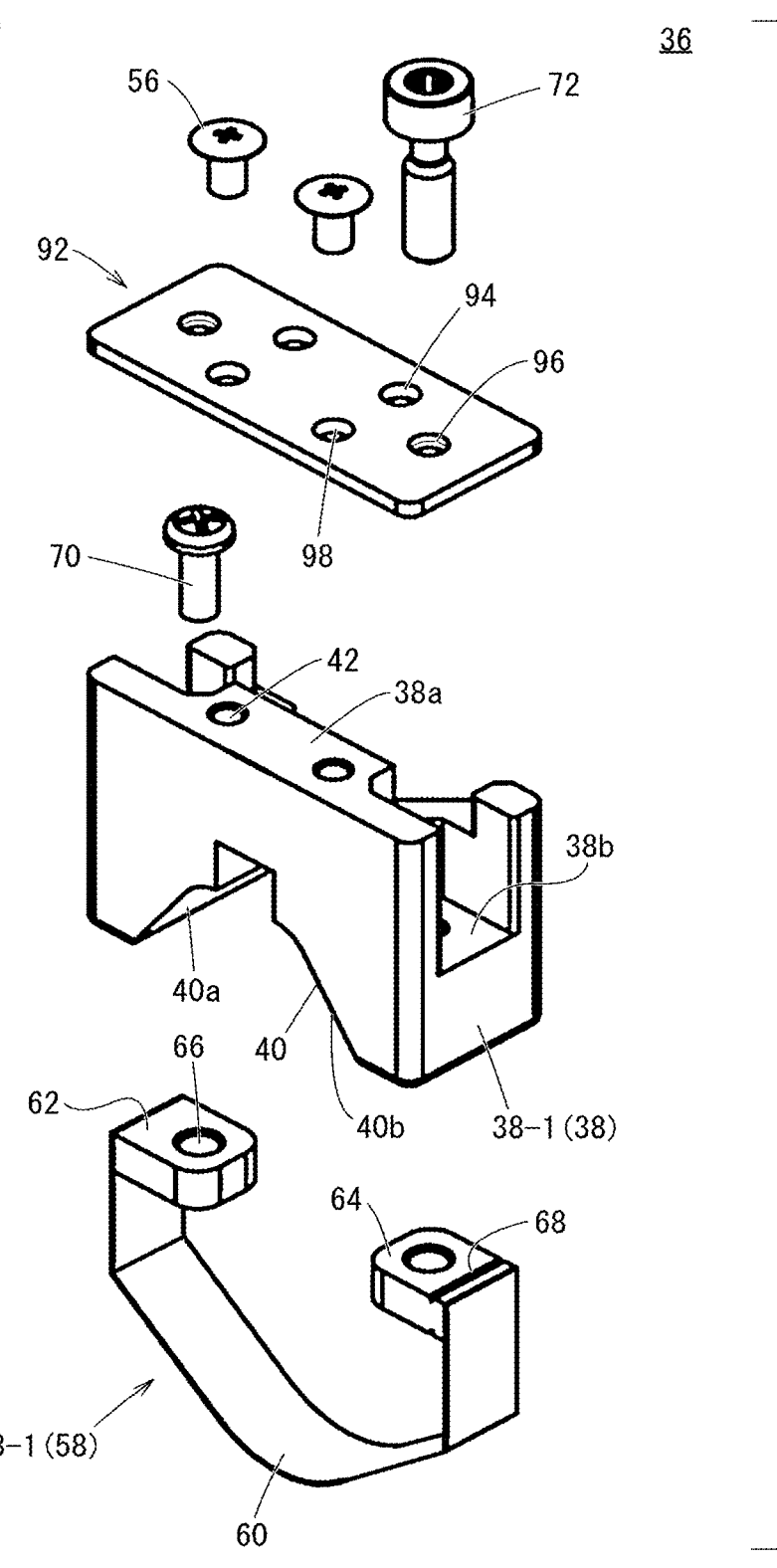
FIG. 10 is a view of a clamp assembly of the ultrasonic flow sensor of FIG. 8 disassembled into components.
Figure 11:
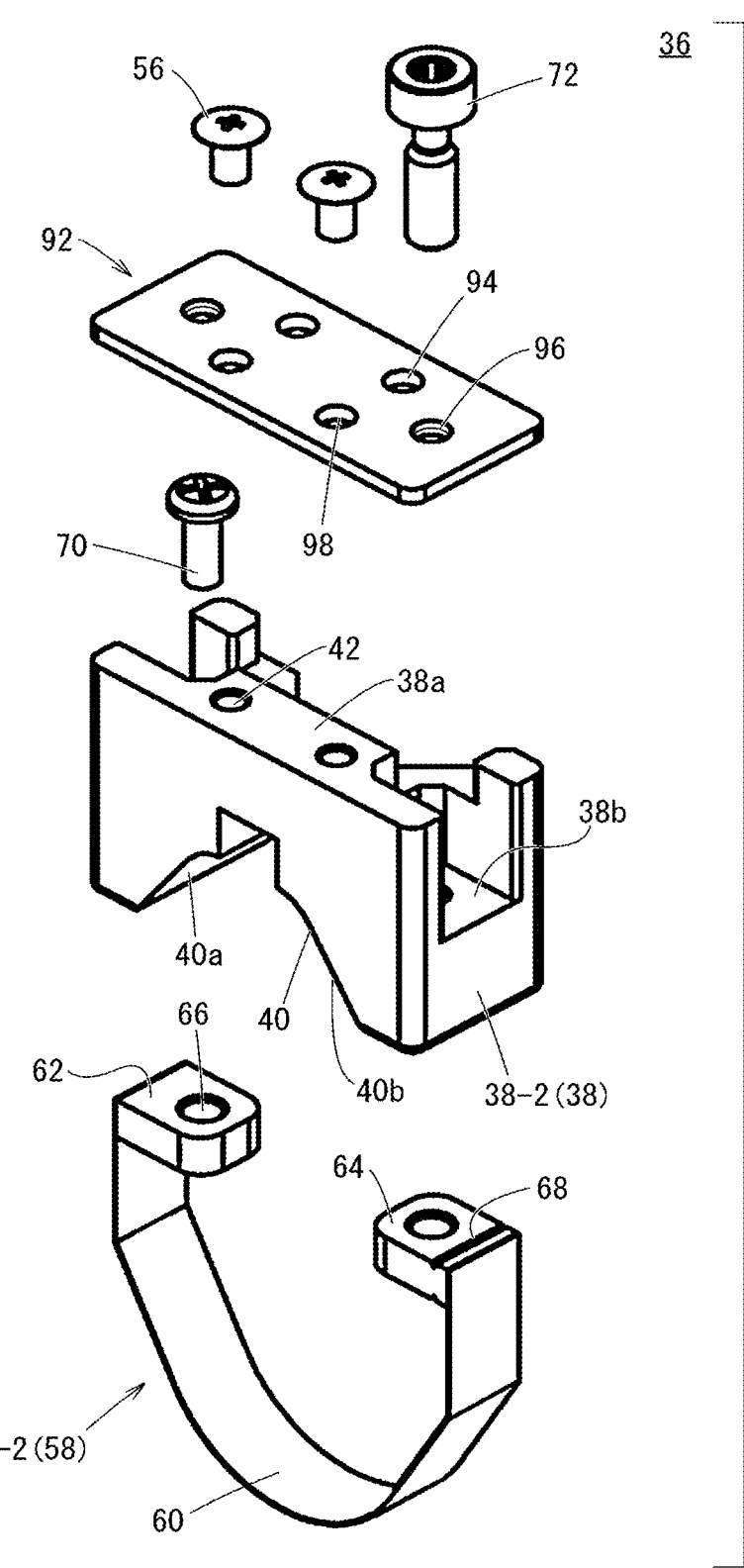
FIG. 11 is a view where a clamp assembly of the ultrasonic flow sensor of FIG. 8 modified for second tube attachment is disassembled into components.
Figure 12:
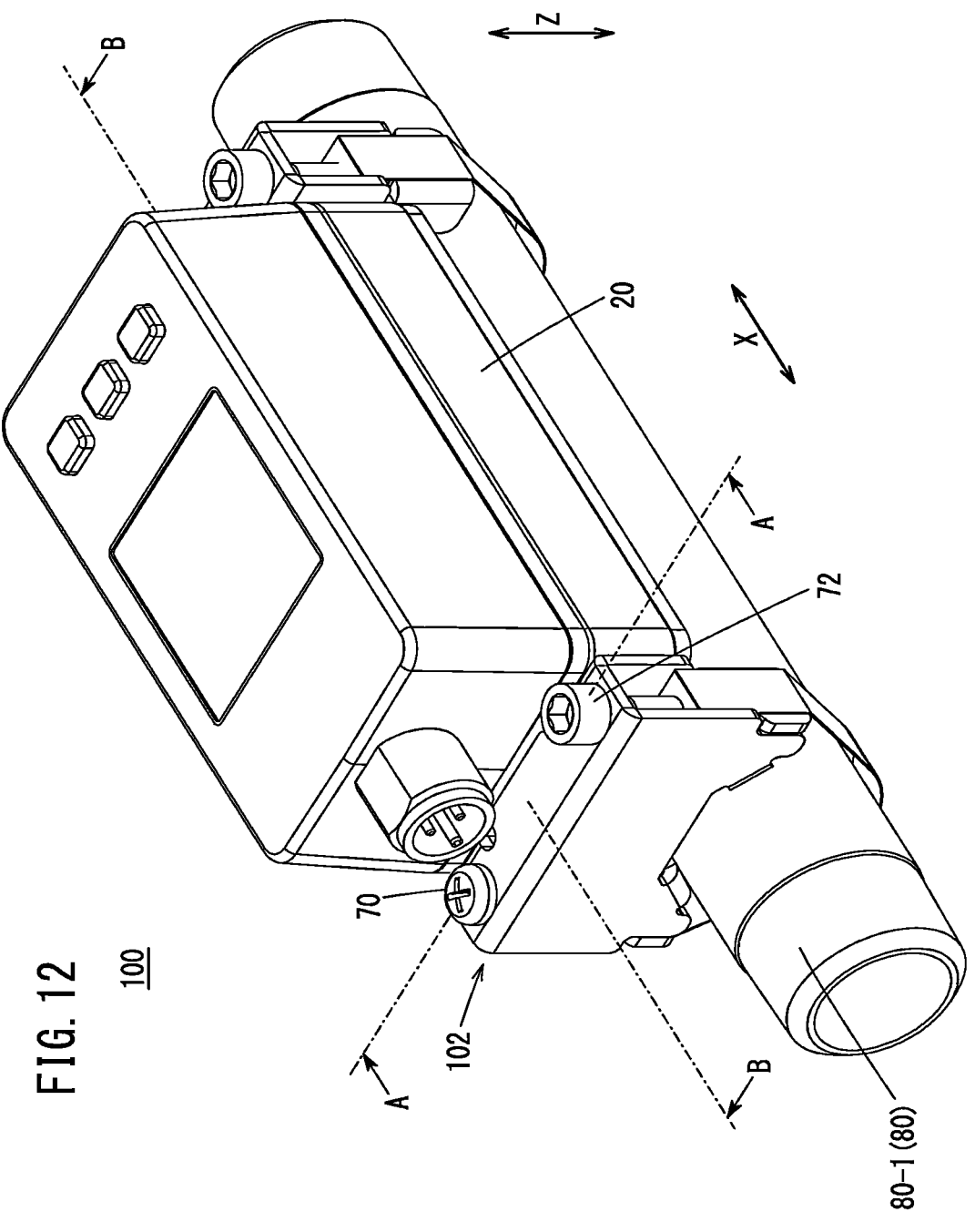
FIG. 12 is an external view of an ultrasonic flow sensor according to the third embodiment of the present invention when the ultrasonic flow sensor is attached to the first tube.
Figure 13:
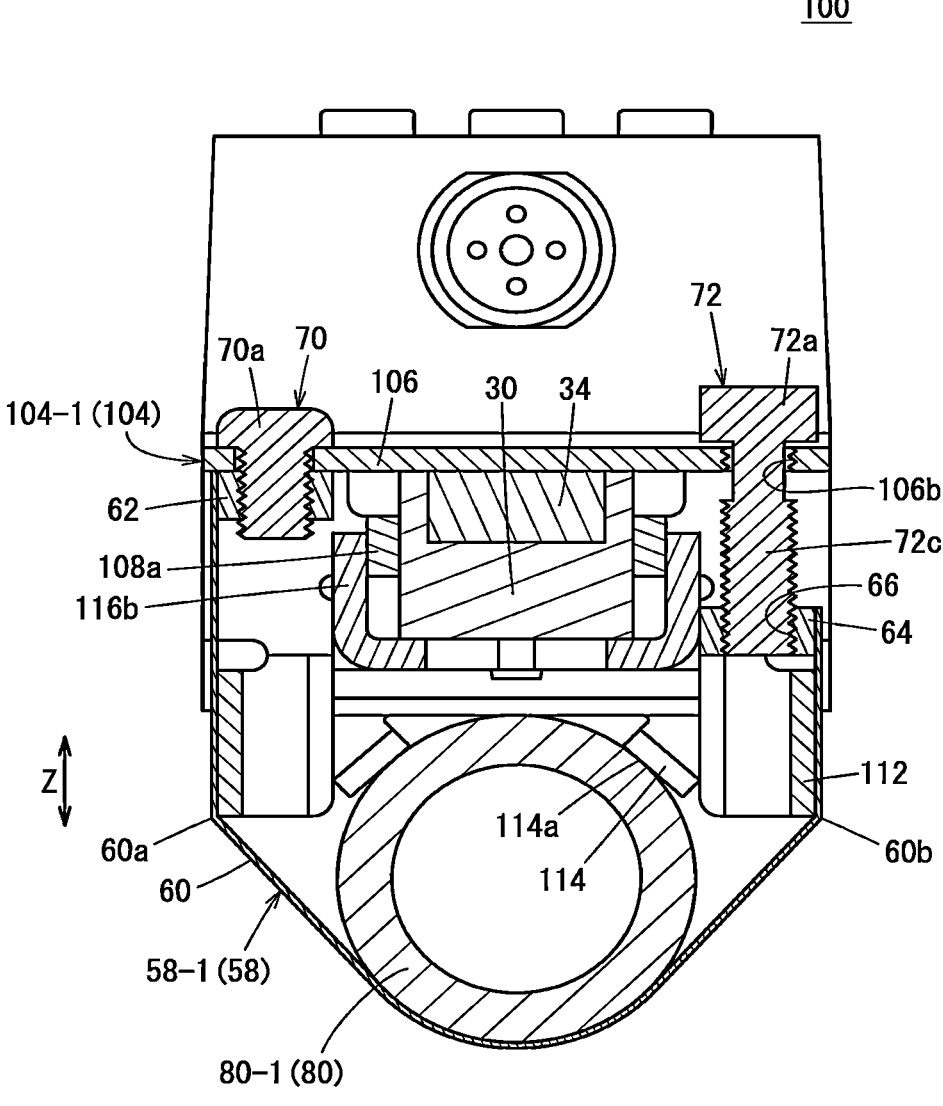
FIG. 13 is a cross-sectional view of the ultrasonic flow sensor of FIG. 12 taken along line A-A.

As shown in FIG. 6, one surface of the clamp plate 48 is a uniform plane and constitutes a first abutment surface 48a that can be brought into contact with the cushion material 34 and the upper surface 30a of the support portion 30 of the lower housing 20. As shown in FIG. 5, a portion of the other surface of clamp plate 48 is thickened by the aforementioned length L. The other surface of the clamp plate 48 constitutes a second abutment surface 48b that can abut, in this thickened region, against the cushion material 34 and the upper surface 30a of the support portion 30 of the lower housing 20. In other words, the other surface of the clamp plate 48 has the second abutment surface 48b with an increased thickness and a base surface 48c with an unincreased thickness. The second abutment surface 48b is parallel to the first abutment surface 48a.

The clamp plate 48 has a pair of engagement holes 50 that extend from the first abutment surface 48a to the second abutment surface 48b. The engagement pin 32 of the lower housing 20 is insertable into the engagement hole 50 of the clamp plate 48. The clamp plate 48 has a pair of slits 52 and a pair of insertion holes 54. The pair of slits 52 and the pair of insertion holes 54 penetrate the clamp plate 48 from the first abutment surface 48a to the base surface 48c. The pair of slits 52 extend in the X direction. The pair of insertion holes 54 are located between the pair of slits 52. The slit 52 is able to receive a small-diameter shaft portion 72b of a later-described clamping screw 72. The insertion holes 54 of the clamp plate 48 are in alignment with the first screw holes 42 of the clamp body 38.

The clamp plate 48 is secured to the clamp body 38 by a pair of mounting screws 56. The mounting screws 56 are inserted through the insertion holes 54 of the clamp plate 48 and screwed into the first screw holes 42 of the clamp body 38. The clamp plate 48 is fixed to the clamp body 38 with the first abutment surface 48a or the base surface 48c abutting against the top surface 38a of the clamp body 38. That is, either the first abutment surface 48a or the base surface 48c of the clamp plate 48 is selected to abut against the top surface 38*a* of the clamp body 38. The clamp plate 48 covers the reference surface 38*b* of the clamp body 38 from above.

The clamp band 58 has a flexible, belt-like band portion 60, a first, thick-walled securing portion 62 connected to one end of the band portion 60, and a second, thick-walled securing portion 64 connected to the other end of the band portion 60. The band portion 60 is bent in a U-shape to fit the outer surface of the tube 80. The first securing portion 62 and the second securing portion 64 have screw holes 66 that extend from their upper surfaces to their lower surfaces. The inner diameter of these screw holes 66 is larger than the inner diameter of the second screw hole 44 of the clamp body 38. The second securing portion 64 has a groove portion 68 into which the tip of a tool such as a driver can be inserted.

Two types of clamp bands 58 are prepared, each having a different length of the band portion 60. In the following, the clamp band 58 with the shorter length of the band portion 60 may be referred to as the first clamp band 58-1. The clamp band 58 with the longer length of the band portion 60 may be referred to as the second clamp band 58-2.

The clamp band 58 is coupled to the clamp body 38 by connecting screws 70. The outer diameter of a shaft portion of the connecting screw 70 is smaller than the inner diameter of the screw hole 66 of the clamp band 58. The connecting screw 70 is inserted into the screw hole 66 of the first securing portion 62 of the clamp band 58 and is screwed into one of the second screw holes 44 of the clamp body 38. Thus, the first securing portion 62 of the clamp band 58 is held between the head of the connecting screw 70 and the reference surface 38*b* of the clamp body 38. In this way, the first securing portion 62 is secured to the clamp body 38.

The clamp assembly 36 is attached to the tube 80 by the tube 80 being held in place between the recess 40 of the clamp body 38 and the band portion 60 of the clamp band 58. The magnitude of the force to tighten the tube 80 with the clamp body 38 and the clamp band 58 is adjustable with the clamping screw 72. The second securing portion 64 is attached to the clamp body 38 in a manner so that the position of the second securing portion 64 can be changed by adjusting the amount of rotation of the clamping screw 72.

As shown in FIG. 2, the clamping screw 72 has a head portion 72*a*, a small-diameter shaft portion 72*b* that is continuous with the head portion 72*a*, and a large-diameter shaft portion 72*c* that is continuous with the small-diameter shaft portion 72*b*. An external thread is formed on the large-diameter shaft portion 72*c*. The length of the large-diameter shaft portion 72*c* (length of external thread) is longer than the thickness of the first securing portion 62 and the second securing portion 64 of the clamp band 58 (length of screw hole 66). The outer diameter of the head portion 72*a* and the outer diameter of the large-diameter shaft portion 72*c* are larger than the width of the slit 52 of the clamp plate 48, and the outer diameter of the small-diameter shaft portion 72*b* is smaller than the width of the slit 52 of the clamp plate 48.

The large-diameter shaft portion 72*c* of the clamping screw 72 is screwed into the screw hole 66 of the second securing portion 64. When the clamping screw 72 is rotated in the screw-advancing direction with the head portion 72*a* of the clamping screw 72 in contact with the clamp plate 48, the second securing portion 64 of the clamp band 58 is displaced upward with respect to the clamp body 38. Therefore, if the first securing portion 62 has been secured to the clamp body 38, the space enclosed between the recess 40 of the clamp body 38 and the band portion 60 of the clamp band

58 is narrowed. The larger the upward displacement of the second securing portion 64, the larger the force with which the tube 80 is tightened by the clamp body 38 and the clamp band 58.

The ultrasonic flow sensor 10 according to the embodiment of the present invention is configured as described above. Next, there will be described the procedure of assembling the clamp assembly 36 from the state where the clamp body 38, the clamp plate 48, and the clamp band 58 are separated from each other, connecting the clamp assembly 36 to the body assembly 12, and attaching it to the tube 80. The ultrasonic flow sensor 10 can be attached to two types of tube 80 having different outer diameters. That is, the ultrasonic flow sensor 10 can be attached to any of the predetermined first tube 80-1 having a smaller outer diameter and the predetermined second tube 80-2 having a larger outer diameter.

As shown in FIG. 5, when the ultrasonic flow sensor 10 is attached to the first tube 80-1, the first clamp band 58-1 is used. The first securing portion 62 and the second securing portion 64 of the first clamp band 58-1 are placed on the reference surface 38*b* of the clamp body 38. In this case, it is necessary to deform the band portion 60 by increasing the distance between the first securing portion 62 and the second securing portion 64.

As previously described, the clamp body 38 has a symmetric shape and thus the second securing portion 64 may be positioned across from any of the pair of second screw holes 44 of the clamp body 38. The second screw hole 44, which the second securing portion 64 faces, can be selected according to the environment in which the tube 80 is installed so that the turning operation of the clamping screw 72, which will be described later, becomes easy.

Then, the connecting screw 70 is inserted into the screw hole 66 of the first securing portion 62 and is screwed into one of the second screw holes 44 of the clamp body 38. In this way, the first clamp band 58-1 is coupled to the clamp body 38. Thereafter, the clamp plate 48 is placed on the clamp body 38 in a manner so that the first abutment surface 48*a* of the clamp plate 48 is in abutment with the top surface 38*a* of the clamp body 38. That is, the clamp plate 48 is placed on the clamp body 38 with the second abutment surface 48*b* facing upward. In this case, the small-diameter shaft portion 72*b* of the clamping screw 72 is inserted into the slit 52 of the clamp plate 48 in advance.

After the clamp plate 48 is placed on the clamp body 38, the pair of mounting screws 56 are inserted through the insertion holes 54 of the clamp plate 48 and screwed into the first screw holes 42 of the clamp body 38. In this way, the clamp plate 48 is secured to the clamp body 38, whereby the assembly of the clamp assembly 36 ends. The above work is performed on a pair of clamp assemblies 36.

When assembly of the clamp assembly 36 is completed, the small-diameter shaft portion 72*b* of the clamping screw 72 is in a state of being inserted into the slit 52 of the clamp plate 48. Since the outer diameters of the head portion 72*a* and the large-diameter shaft portion 72*c* of the clamping screw 72 are larger than the width of the slit 52, the clamping screw 72 is prevented from coming off from the clamp body 38. That is, there is no possibility that the clamping screw 72 may fall off from the clamp bodies 38 and be lost.

Thereafter, the engagement pin 32 of the lower housing 20 is inserted into the engagement hole 50 of the clamp plate 48 from below, and the engagement claw 78 of the couplant holder 76 is inserted into the engagement groove 46 of the clamp body 38 from below. The cushion material 34 protruding from the upper surface 30*a* of the support portion 30 of the lower housing 20 is brought into contact with the first abutment surface 48a of the clamp plate 48. With respect to the lower housing 20, the clamp assembly 36 is supported (coupled) in a manner so that it is not displaceable in the X direction and is displaceable in the Z direction (radial direction of the tube 80). Also, the clamp assembly 36 does not fall out of the body assembly 12. The above coupling work is performed on a pair of clamp assemblies 36.

While the coupled state of the pair of clamp assemblies 36 and the body assembly 12 is maintained, the first tube 80-1 is inserted on the inner side of the pair of first clamp bands 58-1, and the attaching position of the ultrasonic flow sensor 10 with respect to the longitudinal direction of the first tube 80-1 is adjusted. At this time, in each clamp assembly 36, the clamping screw 72 is not yet screwed into the screw hole 66 of the second securing portion 64, and the space enclosed between the recess 40 of the clamp body 38 and the band portion 60 of the first clamp band 58-1 is sufficiently large. Therefore, the first tube 80-1 can be easily inserted on the inner side of the first clamp band 58-1.

Thereafter, at each clamp assembly 36, a tool is engaged with the head portion 72a of the clamping screw 72 to turn the clamping screw 72, and the clamping screw 72 is screwed into the screw hole 66 of the second securing portion 64. When the clamping screw 72 is further turned after the head portion 72a of the clamping screw 72 abuts against the clamp plate 48, the second securing portion 64 of the first clamp band 58-1 is displaced upward away from the reference surface 38b of the clamp body 38. Therefore, the first tube 80-1 is displaced upward relative to the clamp body 38, and is held and tightened between the recess 40 of the clamp body 38 and the band portion 60 of the first clamp band 58-1.

In the process of relative upward displacement of the first tube 80-1 with respect to the clamp body 38, the lower housing 20 of the body assembly 12 is abutted against the first tube 80-1 and is displaced upward with respect to the clamp body 38. Thus, the cushion material 34 is pressed against the first abutment surface 48a of the clamp plate 48 and compressed. The cushion material 34 acts to prevent shock loads from being transmitted to the body assembly 12 when the first tube 80-1 is tightened by the clamp body 38 and the first clamp band 58-1.

When the cushion material 34 is compressed up to a position where the cushion material 34 does not protrude from the upper surface 30a of the support portion 30 of the lower housing 20, the upper surface 30a of the support portion 30 makes contact with the first abutment surface 48a of the clamp plate 48, and the upward displacement of the lower housing 20 with respect to the clamp body 38 stops. At this time, the first path member 22 and the second path member 24 come into contact with the first tube 80-1 via the couplant 74 at a predetermined pressure.

When the force for tightening the first tube 80-1 by the clamp body 38 and the first clamp band 58-1 reaches a desired magnitude, the attachment of the ultrasonic flow sensor 10 to the first tube 80-1 is completed. The cushion material 34 need not be compressed up to a position where it does not protrude from the upper surface 30a of the support portion 30, and the attachment of the ultrasonic flow sensor 10 may be completed in a state where the cushion material 34 slightly protrudes from the upper surface 30a of the support portion 30.

As shown in FIG. 6, when the ultrasonic flow sensor 10 is attached to the second tube 80-2, the second clamp band 58-2 is used. After the second clamp band 58-2 is coupled to the clamp body 38 using the connecting screw 70, the clamp plate 48 is placed on the clamp body 38 in a manner so that the base surface 48c of the clamp plate 48 is in abutment with the top surface 38a of the clamp body 38. That is, the clamp plate 48 is placed on the clamp body 38 with the first abutment surface 48a facing upward. Thereafter, the assembly of the clamp assembly 36 is completed by securing the clamp plate 48 to the clamp body 38 using the mounting screws 56.

Thereafter, the engagement pin 32 of the lower housing 20 is engaged with the engagement hole 50 of the clamp plate 48 from below, and the engagement claw 78 of the couplant holder 76 is engaged with the engagement groove 46 of the clamp body 38 from below. The cushion material 34 protruding from the upper surface 30a of the support portion 30 of the lower housing 20 is brought into contact with the second abutment surface 48b of the clamp plate 48. While the coupled state of the pair of clamp assemblies 36 and the body assembly 12 is maintained, the second tube 80-2 is inserted on the inner side of the pair of second clamp bands 58-2, and the attaching position of the ultrasonic flow sensor 10 with respect to the longitudinal direction of the second tube 80-2 is adjusted.

Thereafter, the second tube 80-2 is tightened between the clamp body 38 and the second clamp band 58-2 by using the clamping screw 72, whereby the attachment of the ultrasonic flow sensor 10 to the second tube 80-2 is completed. When the ultrasonic flow sensor 10 is attached to the second tube 80-2, the body assembly 12 is located lower, by the aforementioned length L with respect to the clamp assembly 36 (see FIG. 7), than when the ultrasonic flow sensor 10 is attached to the first tube 80-1.

When the ultrasonic flow sensor 10 having been attached to the first tube 80-1 is attached to the second tube 80-2, the clamp plate 48 needs to be removed once and the first clamp band 58-1 needs to be removed. The procedure is constructed by tracing the previously described procedure back to a state where the clamp body 38, clamp plate 48, and first clamp band 58-1 are separated from each other. When the first securing portion 62 and the second securing portion 64 of the first clamp band 58-1 are to be disengaged from the reference surface 38b of the clamp body 38, the band portion 60 needs to be deformed. In this case, the work of deforming the band portion 60 is facilitated by inserting the tip of a tool such as a driver into the groove portion 68 of the second securing portion 64.

According to the ultrasonic flow sensor 10 of the present embodiment, the body assembly 12 together with the clamp assembly 36 can be integrally attached to the tube 80 by simply tightening the tube 80 with the clamp band 58 using the clamping screw 72.

The clamp assembly 36 is supported on the lower housing 20 of the body assembly 12 in a manner so that the clamp assembly 36 can be displaced in the radial direction of the tube 80. Therefore, manufacturing errors do not much affect the mounting attitude of the ultrasonic flow sensor 10 to the tube 80, and the axial misalignment of the tube 80 is prevented as much as possible, in comparison with the case where the main body assembly 12 and the clamp assembly 36 are coupled integrally.

The clamp body 38 also has the recess 40 abutting the outer surface of the tube 80 on the two inclined planes 40a, 40b. Therefore, it is adaptable to tubes 80 with various outer diameters.

In the ultrasonic flow sensor 10 according to the present embodiment, the first path member 22 and the second path member 24 are in contact with the tube 80 via the couplant 74. However, the couplant 74 may be omitted and the first path member 22 and the second path member 24 may directly be in contact with the tube 80.

Further, although there have been considered tubes having two types of outer diameters that are frequently used, and the ultrasonic flow sensor 10 has been attached to either the first tube 80-1 or the second tube 80-2, but it is also possible to attach the ultrasonic flow sensor 10 to three or more types of tubes 80. In such a case, the clamp band 58 and the clamp body 38 can be properly exchanged.

Second Embodiment

Next, an ultrasonic flow sensor 90 according to a second embodiment of the present invention will be described with reference to FIGS. 8 to 11. A clamp assembly 36 includes a clamp body 38, a clamp plate 92, and a clamp band 58. In the ultrasonic flow sensor 90 according to the second embodiment, the same or equivalent components as those of the ultrasonic flow sensor 10 described above are denoted by the same reference numerals, and detailed descriptions thereof are omitted.

Two types of clamp bodies 38 are prepared, the distance from the reference surface 38b to the top surface 38a of which differs by the aforementioned length L. In the following, the clamp body 38 with a large distance from the reference surface 38b to the top surface 38a may be referred to as a first clamp body 38-1. In addition, the clamp body 38 with a small distance from the reference surface 38b to the top surface 38a may be referred to as a second clamp body 38-2. The first clamp body 38-1 is identical to the clamp body 38 of the first embodiment. The second clamp body 38-2 is formed by cutting off an upper portion of the first clamp body 38-1 by the length L.

The clamp plate 92 has a uniform thickness and both surfaces of the clamp plate 92 are uniformly planar. The clamp plate 92 has a pair of engagement holes 94 penetrating in the thickness direction, and the engagement pins 32 of the lower housing 20 are insertable into the engagement holes 94 of the clamp plate 92. The clamp plate 92 has a pair of screw holes 96 penetrating in the thickness direction.

The clamp plate 92 has a pair of insertion holes 98 penetrating in the thickness direction. The clamp plate 92 is secured to the clamp body 38 with a pair of mounting screws 56. The mounting screws 56 are inserted through the insertion holes 98 of the clamp plate 92 and screwed into the first screw holes 42 of the clamp body 38. The clamp plate 92 has a symmetrical shape with respect to a plane that includes the axis of the tube 80 and extends in the Z direction.

Two types of clamp bands 58 are prepared: a first clamp band 58-1 in which the length of the band portion 60 is short, and a second clamp band 58-2 in which the length of the band portion 60 is long.

The magnitude of the force to tighten the tube 80 with the clamp body 38 and the clamp band 58 is adjustable with the clamping screw 72. The large-diameter shaft portion 72c of the clamping screw 72 with the external thread is able to be screwed into the screw hole 96 of the clamp plate 92 and the screw hole 66 of the second securing portion 64 of the clamp band 58.

When the ultrasonic flow sensor 90 is attached to the first tube 80-1, the first clamp body 38-1 and the first clamp band 58-1 are used. The first securing portion 62 and the second securing portion 64 of the first clamp band 58-1 are placed on the reference surface 38b of the first clamp body 38-1, and the connecting screw 70 is inserted into the screw hole 66 of the first securing portion 62 and screwed into one of the second screw holes 44 of the first clamp body 38-1.

Next, the clamp plate 92 is placed on the first clamp body 38-1. In this case, it does not matter which face of the clamp plate 92 is directed upward. Further, it is preferable that the large-diameter shaft portion 72c of the clamping screw 72 be screwed into the screw hole 96 of the clamp plate 92 in advance. The clamping screw 72 is coupled to the clamp plate 92 in advance, whereby the subsequent workability is improved and the clamping screw 72 is prevented from being lost. Next, the pair of mounting screws 56 are inserted through the insertion holes 98 of the clamp plate 92 and screwed into the first screw holes 42 of the first clamp body 38-1.

Then, the engagement pin 32 of the lower housing 20 is inserted into the engagement hole 94 of the clamp plate 92, and the engagement claw 78 of the couplant holder 76 is inserted into the engagement groove 46 of the clamp body 38. After the first tube 80-1 is inserted on the inner side of the pair of first clamp bands 58-1, the clamping screw 72 is screwed into the screw hole 66 of the second securing portion 64. At this time, the clamping screw 72 is guided by the screw hole 96 of the clamp plate 92 and screwed into the screw hole 66 of the second securing portion 64, resulting in that the clamping screw 72 does not rattle.

After the head portion 72a of the clamping screw 72 contacts the clamp plate 92, the clamping screw 72 is further turned. The first tube 80-1 is displaced upward relative to the clamp body 38 and is held and tightened between the recess 40 of the clamp body 38 and the band portion 60 of the first clamp band 58-1. Simultaneously, the cushion material 34 is compressed and the upper surface 30a of the support portion 30 is brought into contact with the clamp plate 92. The first path member 22 and the second path member 24 are in contact with the first tube 80-1 via the couplant 74 at a predetermined pressure.

When the ultrasonic flow sensor 90 is attached to the second tube 80-2, the second clamp body 38-2 and the second clamp band 58-2 are used. The working procedure up to the attachment is the same as that in the case where the ultrasonic flow sensor 10 described above is attached to the second tube 80-2. When the ultrasonic flow sensor 90 is attached to the second tube 80-2, the body assembly 12 is located lower by the aforementioned length L with respect to the clamp assembly 36 in comparison with when the ultrasonic flow sensor 90 is attached to the first tube 80-1.

According to the ultrasonic flow sensor 90 of the present embodiment, the body assembly 12 together with the clamp assembly 36 can be integrally attached to the tube 80 by simply tightening the tube 80 with the clamp band 58 using the clamping screw 72. In addition, the clamp assembly 36 is supported on the lower housing 20 of the body assembly 12 in a manner so that the clamp assembly 36 is displaceable in the radial direction of the tube 80, resulting in that the axial misalignment of the tube 80 is prevented as much as possible.

Further, since the clamp plate 92 has the screw hole 96 into which the large-diameter shaft portion 72c of the clamping screw 72 can be screwed, the working efficiency when the clamping screw 72 is turned improves, and the clamping screw 72 can be prevented from being lost.

Third Embodiment

Next, an ultrasonic flow sensor 100 according to a third embodiment of the present invention will be described with reference to FIGS. 12 to 17. In the ultrasonic flow sensor 100 according to the third embodiment, the same or equivalent components as those of the above-described ultrasonic flow sensors 10 and 90 are denoted by the same reference numerals, and detailed description thereof may be omitted.

Figure 15:
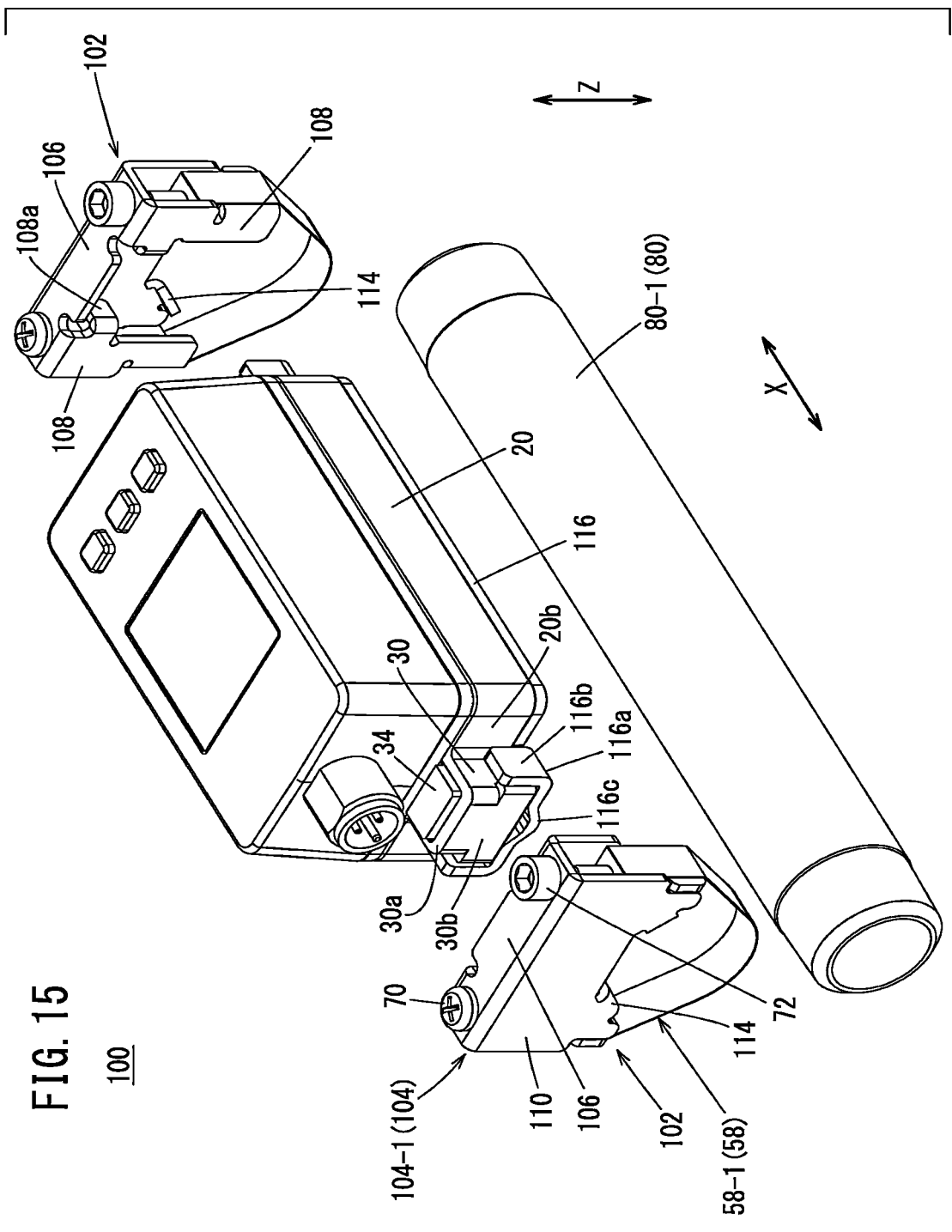
FIG. 15 is a view of the ultrasonic flow sensor of FIG. 12 with clamp assemblies separated from a body assembly.
Figure 16:
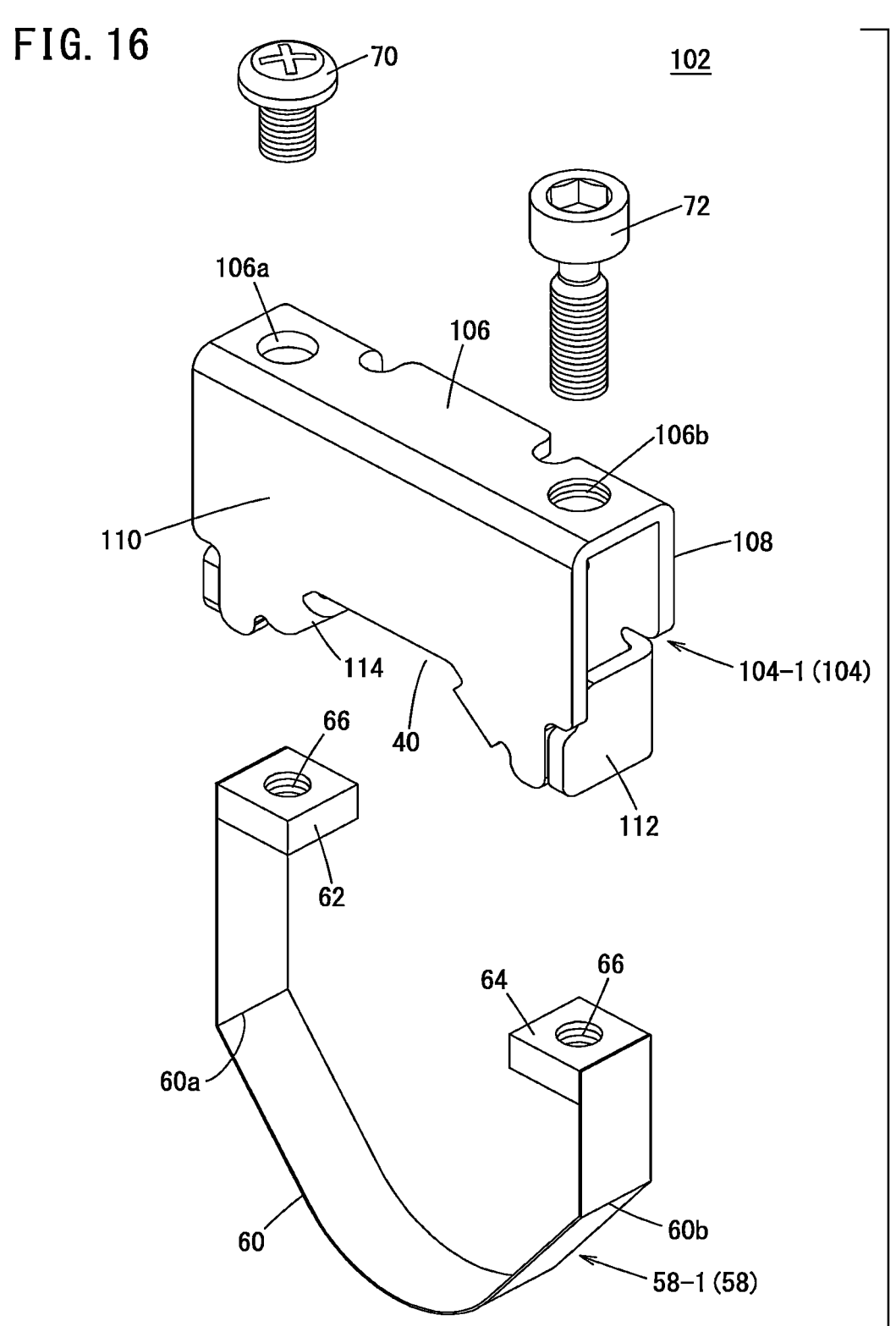
FIG. 16 is a view of a clamp assembly of the ultrasonic flow sensor of FIG. 12 disassembled into components.
Figure 17:
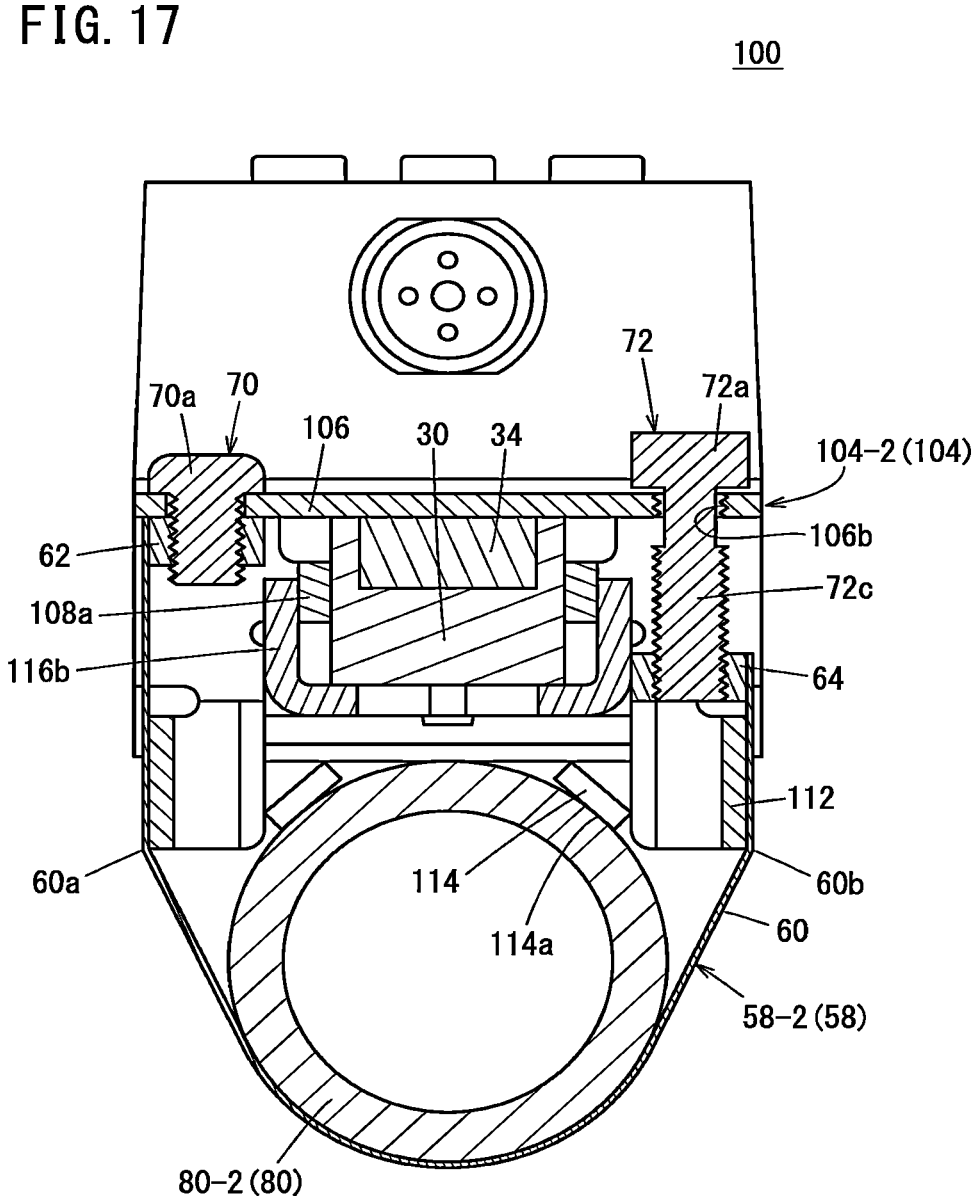
FIG. 17 is a cross-sectional view corresponding to FIG. 13 for the ultrasonic flow sensor of FIG. 12 modified for second tube attachment.

As shown in FIG. 16, a clamp assembly 102 includes a clamp body 104 and a clamp band 58. As shown in FIG. 15, the clamp body 104 includes a rectangular first wall portion 106, a pair of second wall portions 108 extending downward from the edge corresponding to one longer side of the first wall portion 106, and a third wall portion 110 extending downward from the edge corresponding to the other longer side of the first wall portion 106. The third wall portion 110 is in contact with the end surface 30b of the support portion 30 of the lower housing 20. A fourth wall portion 112, which is continuous with the second wall portion 108, is in contact with the inner side of the clamp band 58. A pair of fifth wall portions 114, which are continuous with the third wall portion 110, have inclined planes 114a (see FIG. 13). A pair of inclined planes 114a constitute a recess 40 that receives a tube 80.

The first wall portion 106 has an insertion hole 106a penetrating in the thickness direction and a screw hole 106b penetrating in the thickness direction. The lower surface of the first wall portion 106 can abut against the cushion material 34 and the upper surface 30a of the support portion 30 of the lower housing 20. Provided with the first wall portion 106, the clamp body 104 also has the function of the clamp plate 92 in the ultrasonic flow sensor 90 described above. The clamp body 104 includes an engagement piece 108a that is continuous with the second wall portion 108, and the engagement piece 108a extends toward the third wall portion 110 (see FIG. 15).

Figure 14:
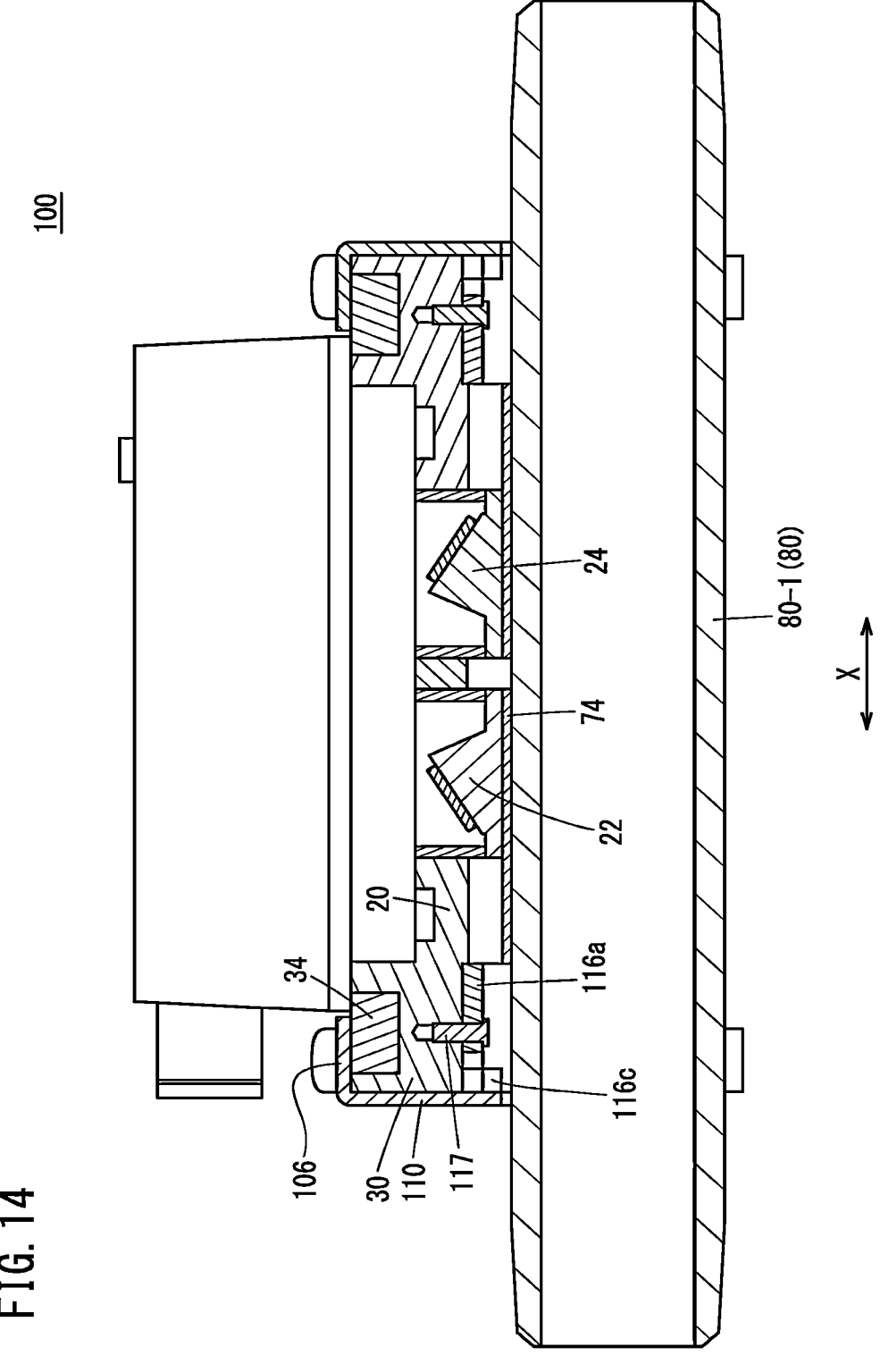
FIG. 14 is a cross-sectional view of the ultrasonic flow sensor of FIG. 12 taken along line B-B.

The couplant holder 116 is fixed to the lower housing 20 by a set screw 117 (see FIG. 14). The couplant holder 116 includes extended portions 116a extending from both ends in the X direction, and a pair of engagement pieces 116b extending upward from each extended portion 116a. The second wall portion 108 of the clamp body 104 is inserted between the engagement piece 116b of the couplant holder 116 and the side surface 20b of the lower housing 20. The engagement piece 108a of the clamp body 104 is inserted between the engagement piece 116b of the couplant holder 116 and the support portion 30 of the lower housing 20. The extended portion 116a of the couplant holder 116 has a protrusion 116c protruding downward, and the protrusion 116c faces the tube 80. The lower end of the protrusion 116c is located higher than the lower surface of the first path member 22 and the lower surface of the second path member 24.

The band portion 60 of the clamp band 58 has a first bent portion 60a and a second bent portion 60b. The distance from the first bent portion 60a to the first securing portion 62 is longer than the distance from the second bent portion 60b of the band portion 60 to the second securing portion 64. The clamp band 58 is coupled to the clamp body 104 by the connecting screw 70. The connecting screw 70 is inserted into the insertion hole 106a of the first wall portion 106 of the clamp body 104 and is screwed into the screw hole 66 of the first securing portion 62 of the clamp band 58. Thus, the first wall portion 106 of the clamp body 104 is held between the head portion 70a of the connecting screw 70 and the first securing portion 62 of the clamp band 58.

The large-diameter shaft portion 72c of the clamping screw 72 is screwed into the screw hole 66 of the second securing portion 64 of the clamp band 58. When the clamping screw 72 rotates in the screw-advancing direction with the head portion 72a of the clamping screw 72 in contact with the first wall portion 106 of the clamp body 104, the second securing portion 64 of the clamp band 58 is displaced upward with respect to the clamp body 104. The greater the upward displacement of the second securing portion 64, the greater the force with which the tube 80 is tightened by the clamp body 104 and the clamp band 58.

Two types of clamp bodies 104 are prepared, namely, a first clamp body 104-1 and a second clamp body 104-2, which differ in the arrangement of the fifth wall portions 114. The reason for the different arrangement of the fifth wall portion 114 is to make the length from the upper end of the tube 80 to the first wall portion 106 the same even if the diameter of the tube 80 in contact with the inclined plane 114a of the fifth wall portion 114 is different. As understood with reference to FIGS. 13 and 17, in this embodiment, the fifth wall portion 114 of the second clamp body 104-2 is located higher than the fifth wall portion 114 of the first clamp body 104-1. Two types of clamp bands 58 are prepared: a first clamp band 58-1 in which the length of the band portion 60 is short, and a second clamp band 58-2 in which the length of the band portion 60 is long (see FIG. 17).

When the ultrasonic flow sensor 100 is attached to the first tube 80-1, the first clamp body 104-1 and the first clamp band 58-1 are used. First, the connecting screw 70 is inserted into the insertion hole 106a of the first wall portion 106 of the first clamp body 104-1 and is screwed into the screw hole 66 of the first securing portion 62 of the first clamp band 58-1. The connecting screw 70 is turned in the screw-advancing direction until the first wall portion 106 is held between the head portion 70a of the connecting screw 70 and the first securing portion 62, whereby the first securing portion 62 is secured to the first clamp body 104-1. It may be preferable that the large-diameter shaft portion 72c of the clamping screw 72 have been screwed into the screw hole 106b of the first wall portion 106.

Then, the second wall portion 108 of the first clamp body 104-1 is inserted between the engagement piece 116b of the couplant holder 116 and the side surface 20b of the lower housing 20, and the engagement piece 108a of the first clamp body 104-1 is inserted between the engagement piece 116b of the couplant holder 116 and the support portion 30 of the lower housing 20. At this time, the third wall portion 110 of the first clamp body 104-1 abut against the end surface 30b of the support portion 30 of the lower housing 20. That is, the second wall portion 108 is inserted between the engagement piece 116b of the couplant holder 116 and the side surface 20b of the lower housing 20, and the third wall portion 110 abuts against the end surface 30b of the support portion 30 of the lower housing 20. This suppresses the displacement of the clamp assembly 102 in the X-direction with respect to the lower housing 20. In this case, a slight displacement of the clamp assembly 102 in the X direction with respect to the lower housing 20 may be allowed.

After the first tube 80-1 is inserted on the inner side of the pair of first clamp band 58-1, the clamping screw 72 is screwed into the screw hole 66 of the second securing portion 64 of the first clamp band 58-1. After the head portion 72a of the clamping screw 72 contacts the first wall portion 106 of the first clamp body 104-1, the clamping screw 72 is further turned. The first tube 80-1 is displaced upward with respect to the first clamp body 104-1 and is held between the recess 40 of the first clamp body 104-1 and the band portion 60 of the first clamp band 58-1. The upper surface 30a of the support portion 30 of the lower housing 20 comes into contact with the first wall portion 106 of the first clamp body 104-1, and the first path member 22 and the second path member 24 come into contact with the first tube 80-1 via the couplant 74 at a predetermined pressure.

In the operation of turning the clamping screw 72 to clamp the first tube 80-1 between the first clamp body 104-1 and the first clamp band 58-1, a force may act that inclines the lower housing 20 with respect to the first tube 80-1. That is, when the rotation of the clamping screw 72 is advanced for only one of the pair of clamp assemblies 102, out of the pair of support portions 30 of the lower housing 20, only the support portion 30 that is close to that clamp assembly 102 tends to approach the first tube 80-1. In this case, the protrusion 116c formed on the extended portion 116a of the couplant holder 116 close to that support portion 30 comes in contact with the first tube 80-1. Therefore, the inclination of the lower housing 20 is suppressed.

When the ultrasonic flow sensor 100 is attached to the second tube 80-2, the second clamp body 104-2 and the second clamp band 58-2 are used. The working procedure is the same as that for attaching the ultrasonic flow sensor 100 to the first tube 80-1.

According to the ultrasonic flow sensor 100 of the present embodiment, the body assembly 12 together with the clamp assembly 36 can be integrally attached to the tube 80 by simply tightening the tube 80 with the clamp band 58 using the clamping screw 72. In addition, the clamp assembly 36 is supported on the lower housing 20 of the body assembly 12 in a manner so that the clamp assembly 36 is displaceable in the radial direction of the tube 80, resulting in that the axial misalignment of the tube 80 is prevented as much as possible.

Further, since the first wall portion 106 has the screw hole 106b into which the large-diameter shaft portion 72c of the clamping screw 72 can be screwed, the working efficiency when the clamping screw 72 is turned improves, and the clamping screw 72 can be prevented from being lost. In addition, since the clamp body 104 has the first wall portion 106 that also serves as the clamp plate 92, the assembly work of the clamp assembly 102 is simple.

The ultrasonic flow sensor according to the present invention is not limited to the embodiments described above, but various configurations can be adopted therein without deviating from the essence and gist of the present invention.

The invention claimed is:

1. An ultrasonic flow sensor attached to an outside of a tube, comprising:
a body assembly; and
clamp assemblies positioned at opposite ends of the body assembly, wherein the body assembly includes a housing that houses an ultrasonic element, the clamp assemblies include clamp bands, and
the clamp assemblies are supported on the housing in a manner so that the clamp assemblies are displaceable in a radial direction of the tube, wherein
each of the clamp assemblies includes a clamp body, the clamp band includes a flexible band portion, a first securing portion connected to one end of the band portion, and a second securing portion connected to another end of the band portion, the tube is clamped by the clamp body and the band portion, the first securing portion is secured to the clamp body, and the second securing portion is attached to the clamp body in a manner so that a position of the second securing portion is able to be changed.

2. The ultrasonic flow sensor according to claim 1, wherein
the clamp body includes a recess for receiving the tube and abuts against the tube on two inclined planes that constitute the recess.

3. The ultrasonic flow sensor according to claim 1, wherein
each of the clamp assemblies includes a clamp plate, and the position of the second securing portion with respect to the clamp body is changed by screwing a clamping screw into the second securing portion of the clamp band with a head portion of the clamping screw in contact with the clamp plate.

4. The ultrasonic flow sensor according to claim 3, wherein
the housing is provided with an engagement pin, and the clamp plate includes an engagement hole into which the engagement pin is inserted.

5. The ultrasonic flow sensor according to claim 3, wherein
one surface of the clamp plate is a uniform plane and constitutes a first abutment surface that is able to make contact with the housing, and another surface of the clamp plate includes a second abutment surface that is able to contact with the housing by increasing a thickness in a predetermined region.

6. The ultrasonic flow sensor according to claim 3, wherein both surfaces of the clamp plate are each a uniform plane.

7. The ultrasonic flow sensor according to claim 1, wherein
a first wall portion of the clamp body abuts against the housing, and the position of the second securing portion with respect to the clamp body is changed by screwing a clamping screw into the second securing portion of the clamp band with a head portion of the clamping screw in contact with the first wall portion.

8. The ultrasonic flow sensor according to claim 7, wherein
a path member to which the ultrasonic element is attached is in contact with the tube via a couplant, the couplant is attached to the housing by a couplant holder, a second wall portion of the clamp body is inserted between an engagement piece of the couplant holder and the housing, and a third wall portion of the clamp body abuts against the housing.

9. The ultrasonic flow sensor according to claim 8, wherein
an extended portion extending from an end of the couplant holder includes a protrusion facing the tube.

10. The ultrasonic flow sensor according to claim 3, wherein a cushion material that abuts the clamp plate is attached to the housing.

11. The ultrasonic flow sensor according to claim 3, wherein
the clamping screw includes a small-diameter shaft portion that is continuous with the head and a large-diameter shaft portion that is continuous with the small-diameter shaft portion, an external thread is formed on the large-diameter shaft portion, the clamp plate includes a slit into which the small-diameter shaft portion is insertable, and outer diameters of the head and the large-diameter shaft portion are larger than a width of the slit.

12. The ultrasonic flow sensor according to claim 3, wherein
the clamping screw includes a small-diameter shaft portion that is continuous with the head, and a large-diameter shaft portion that is continuous with the small-diameter shaft portion, an external thread is formed on the large-diameter shaft portion, and the clamp plate includes a screw hole into which the large-diameter shaft portion is able to be screwed.

13. The ultrasonic flow sensor according to claim 1, wherein the second securing portion includes a groove portion into which a tip of a tool is insertable.

14. The ultrasonic flow sensor according to claim 1, wherein a path member to which the ultrasonic element is attached is in contact with the tube via a couplant.

15. The ultrasonic flow sensor according to claim 14, wherein the clamp assembly includes a clamp body, the couplant is attached to the housing by a couplant holder, the couplant holder includes an engagement claw, and the clamp body includes an engagement groove into which the engagement claw is inserted.

* * * * *